US00RE35943E

United States Patent [19]

Weinberg et al.

[11] E Patent Number: Re. 35,943

[45] Reissued Date of Patent: Nov. 3, 1998

[54] SOLDERING MACHINE FOR ROPE CHAIN

[75] Inventors: Eitan Weinberg, 16-16 Split Rock St., Fairlawn, N.J. 07410; Aviad Ofrat, 216 Pulis Ave., Franklin Lakes, N.J. 07417

[73] Assignees: Eitan Weinberg, Fairlawn; Aviad Ofrat, Franklin Lakes, both of N.J.; Arie Gur, New York, N.Y.

[21] Appl. No.: 184,670

[22] Filed: Jan. 21, 1994

Related U.S. Patent Documents

Reissue of:

[64] Patent No.: 5,115,959
Issued: May 26, 1992
Appl. No.: 694,128
Filed: May 1, 1991

[51] Int. Cl.[6] ..... B23K 31/02; B23K 3/00

[52] U.S. Cl. ..... 228/212; 228/248.1; 228/4.1; 228/11; 228/43; 29/160.6; 59/82

[58] Field of Search ..... 228/4.1, 5.1, 11, 228/15.1, 35, 43, 49.1, 212, 248.1; 29/160.6; 59/3, 16, 25, 31, 80, 82

[56] References Cited

U.S. PATENT DOCUMENTS

| | | | |
|---|---|---|---|
| 4,298,154 | 11/1981 | DeFusco | 228/212 |
| 4,442,150 | 4/1984 | Greiner et al. | 29/469 |
| 4,503,664 | 3/1985 | Allazzetta et al. | 59/16 |
| 4,569,472 | 2/1986 | Zettl | 59/31 |
| 4,658,576 | 4/1987 | Massimo et al. | 59/16 |
| 4,769,884 | 9/1988 | Datseris et al. | 59/31 |
| 4,903,475 | 2/1990 | Bucefari et al. | 59/16 |

*Primary Examiner*—Samuel M. Heinrich
*Attorney, Agent, or Firm*—Kenyon & Kenyon

[57] ABSTRACT

An automatic soldering machine for soldering a rope chain comprises a pair of gears, each with a peripheral surface defining a trench which engages one of the strands of the rope chain and which is rotatable to precisely feed and place successive link junctions of the chain relative to hollow solder applying needles. The needles are reciprocally movable and serve to apply a premeasured amount of solder paste at the link junctions of the rope chain. A heater, for example, an induction heater, heats the chain, causing the solder to flow and then set and thereby secure the chain links together.

33 Claims, 5 Drawing Sheets

FIG. 3(a)
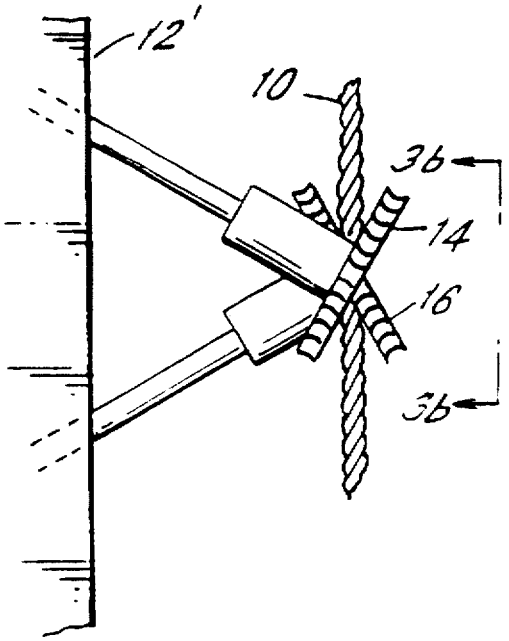
FIG. 3(b)
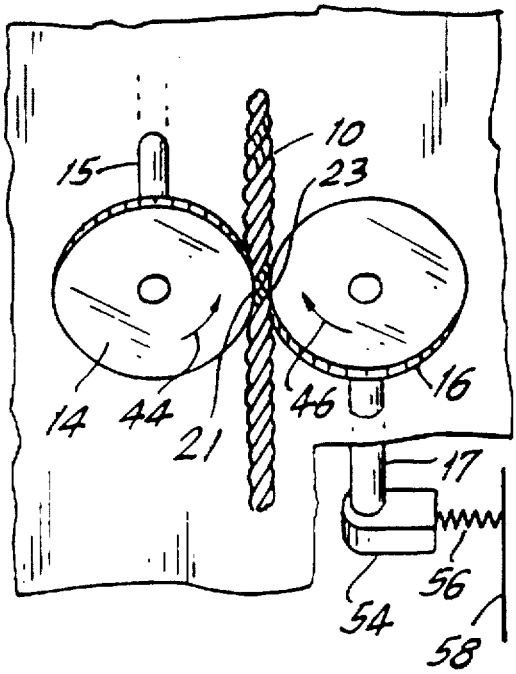
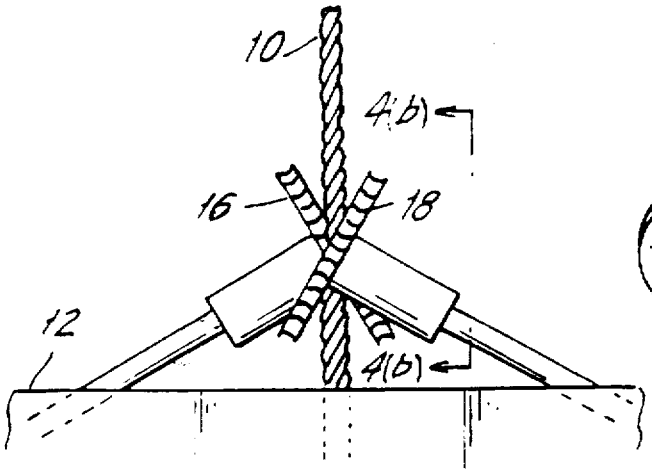
FIG. 4(a)
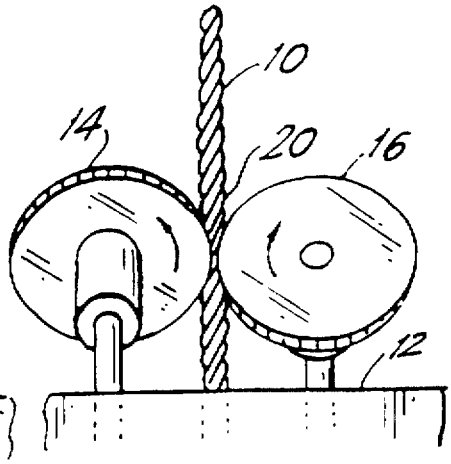
FIG. 4(b)

SOLDERING MACHINE FOR ROPE CHAIN

Matter enclosed in heavy brackets [ ] appears in the original patent but forms no part of this reissue specification; matter printed in italics indicates the additions made by reissue.

BACKGROUND OF THE INVENTION

The present invention generally relates to a machine for use in connection with the fabrication of jewelry, specifically rope chains and, more particularly relates to an automatic soldering machine for automatically soldering rope chains.

A rope chain is a chain in the form of a rope constituted by a helical series of open rings that arc interlinked with one another to define a configuration similar to a continuous double-stranded rope.

Prior machines of the general character indicated are exemplified by Tega et al. U.S. Pat. No. 4,127,987; Tega, U.S. Pat. No. 4,311,9001, and Allazzetta et al., U.S. Pat. No. 4,503,664. Allazzetta et al. is specifically directed to a machine by which the fabrication of rope chains is automated. The subject patent notes that linking the open rings found in a rope chain requires great dexterity, manual agility and uninterrupted concentration on the part of the workmen. It further notes that the production of these chains by hand involves long periods of time and consequently is very labor-intensive and leads to a high selling price.

The Allazzetta rope chain fabricating machine and, indeed, several earlier machines have concentrated on automating the process of assembling and interlinking the open rings of a rope chain, in a manner which imparts to the rope chain its characteristic look. The shape of the rope chain is maintained in these machines by reinforcing wires which are threaded through the chain.

In the known production process, subsequent to the automatic assembling of the chain, solder paste is manually applied between pairs of adjacent rings of the rope chain, the chain is heated and the solder sets. Thereafter, the reinforcing wires are removed.

However, the prior art has not tackled the task of automating the soldering operation which is still carried out by hand. The soldering operation therefore consumes a long period of time, depends on less reliable manual labor, and is consequently labor-intensive and more costly.

SUMMARY OF THE INVENTION

Accordingly, the general object of the present invention is to provide a machine for soldering a rope chain completely automatically.

It is a further object of the invention to provide a soldering machine for a rope chain or the like which is effective for applying a precise and consistent amount of solder paste to the rings of a rope chain.

It is still a further object of the invention to provide a rope chain soldering machine which is effective for applying solder paste at precisely controlled locations between pairs of rings of a rope chain.

The foregoing and other objects of the present invention are realized with a rope chain soldering machine that is simple in construction, reliable in operation, and effective to fully automate the soldering process.

Preferably, the soldering machine of the instant invention includes a working platform and a chain feeding mechanism for feeding the fully-formed but not yet soldered rope chain from a supply bin below the platform to a soldering station located above the platform.

The chain is fed by means of a pair of gears each of which is rotatably supported on a respective shaft and positioned relative to the other gear so that the circumferential peripheral surfaces of the gears engage and hold therebetween the rope chain.

More particularly, the peripheral circumferential surfaces are formed with gear teeth having a pitch that corresponds to the distance between corresponding links or rings in the rope chain. Operationally, the gears are rotated stepwise and their angular orientation and gear pitch is such that precise conformance is established between the gear teeth and the helically oriented individual open links of the rope chain. Each sequential rotation of the gears is designed to advance the rope chain from a previous to a next soldering position on the chain.

After each rotation, first and second solder-applying hollow needles move laterally toward the chain and apply to it a specified, predetermined amount of solder paste. The paste is applied on diametrically opposed sides of the chain, precisely at the junction of a pair of links that are at that instant positioned adjacent the hollow needles.

The process is repeated whereby minute amounts of solder paste are sequentially applied at the junctions between the successively presented links as the rope chain is conveyed past the hollow solder-applying needles.

A heater, for example, an induction heater, disposed forward of the hollow needles in the feeding directing of the rope chain, serves to heat the chain to cause the solder to flow and then set and thus join the links to one another. Thereafter, the reinforcing wires that are removed.

Other features and advantages of the present invention will become apparent from the following description of the invention which refers to the accompanying drawing.

BRIEF DESCRIPTION OF THE DRAWINGS

FIG. 3(a) is a side view of a chain feeding means for a rope chain in accordance with a first embodiment of the present invention.

FIG. 3(b) is a side view in the direction of lines 3(b) of FIG. 3(a).

FIG. 4(a) is a side view of a chain feeding means for a rope chain in accordance with a second embodiment of the present invention.

FIG. 4(b) is a side view of FIG. 4(a) in the direction of lines 4(b).

DETAILED DESCRIPTION OF THE DRAWINGS

Figure 2A:
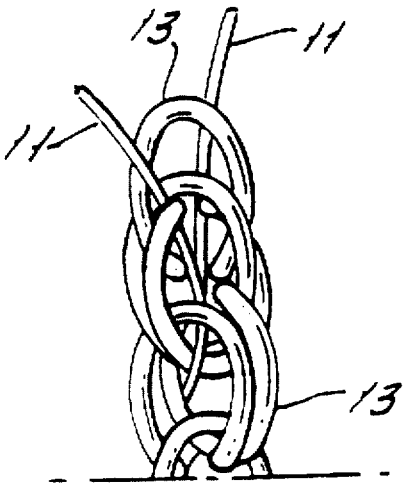
FIGS. 2(a) and 2(b) show a rope chain during successive stages of its fabrication.
Figure 2B:
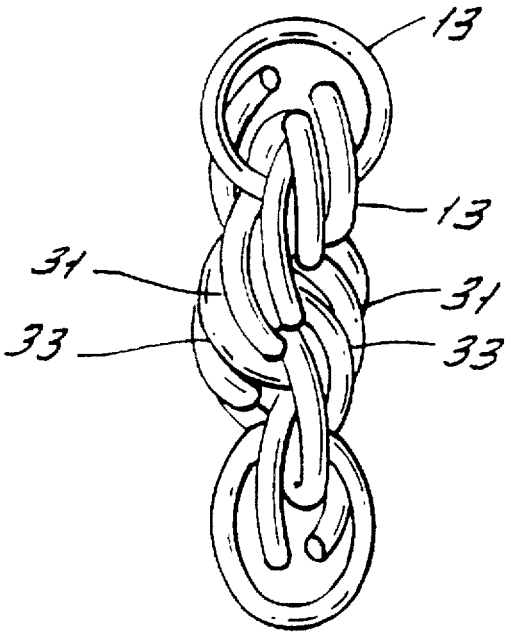

Referring to the Figures, the present invention is directed to a mechanism for feeding and soldering a rope chain 10 in the form of a rope constituted by a helical series of open rings 13 (FIGS. 2(a) and 2(b)), in which adjacent rings 13 are interlinked to define a configuration similar to a continuous double-stranded rope. More specifically, it is comprised of a first, continuous strand of links 21 intertwisted with a second continuous strand 23. The rope chain 10 is preassembled, either manually or automatically, by forming, feeding and interlinking the rings 13 and the shape thereof is temporarily maintained by reinforcing wires 11 which are threaded through it. Thereafter, the open rings 13 are soldered to one another and the reinforcing wires 11 are removed, enabling the chain 10 to maintain its characteristic rope chain shape.

To that end, a preassembled, unsoldered rope chain 10 (FIG. 2(b)) is fed as shown in FIG. 1(b) to emerge above a platform 12 which supports a rope chain feeding mechanism 9 (described below) for feeding and soldering the rope chain 10. A soldering mechanism 7 which serves to apply dabs of solder paste to the chain 10 is followed by a heating station 5 which heats the solder paste, causing it to flow, set, and thus solder the rings 13 to one another.

Specifically, the rope chain feeding mechanism 9 comprises a pair of gears 14 and 16 supported on and rotatable by respective shafts 15 and 17. The gears 14 and 16 are positioned relative to one another in a manner that enables the gears to hold between them the rope chain 10 as shown in FIGS. 3(b) or 4(b).

To enable precise feeding and positioning of successive ring junctions 31 and 33 (FIG. 2(b)) of the rope chain 10 relative to the soldering mechanism 7, the peripheral surfaces of the gears 14 and 16 have been shaped to provide a trench 19 in which gear teeth 18 are formed. The size and shape of the trench 19 conforms to the corresponding shape of the strands 21 and 23 of the rope chain 10. Further, the spacial orientation of the shafts 15 and 17, and hence of the trenches 19, is such that the strands 21 and 23 fit snugly in the trenches 19, the gear teeth 18 registering with the link junctions 31, 33, etc.

Each of the gears 14 and 16 is rotated by respective one of the gear boxes 26 and 28 which are in turn driven by a motor 34 under the control of a motor controller 36. The motor controller 36 energizes the motor 34 in discrete sequential steps. This sequentially rotates the gears 14 and 16 and serves to rotate and advance the rope chain 10 by the equivalent of one rope chain link, corresponding to the advancement of the gear teeth 18 by one gear tooth.

As can best be appreciated from FIG. 3(b), the gear 14 engages the first strand 21 of the rope chain 10 with its teeth gear 18 interengaged and registered with the link junctions 31, 33, etc. thereof. The gear 16, on the other hand, engages the second strand 23 with its teeth gear 18 similarly registering with the link junctions thereof.

Figure 1:
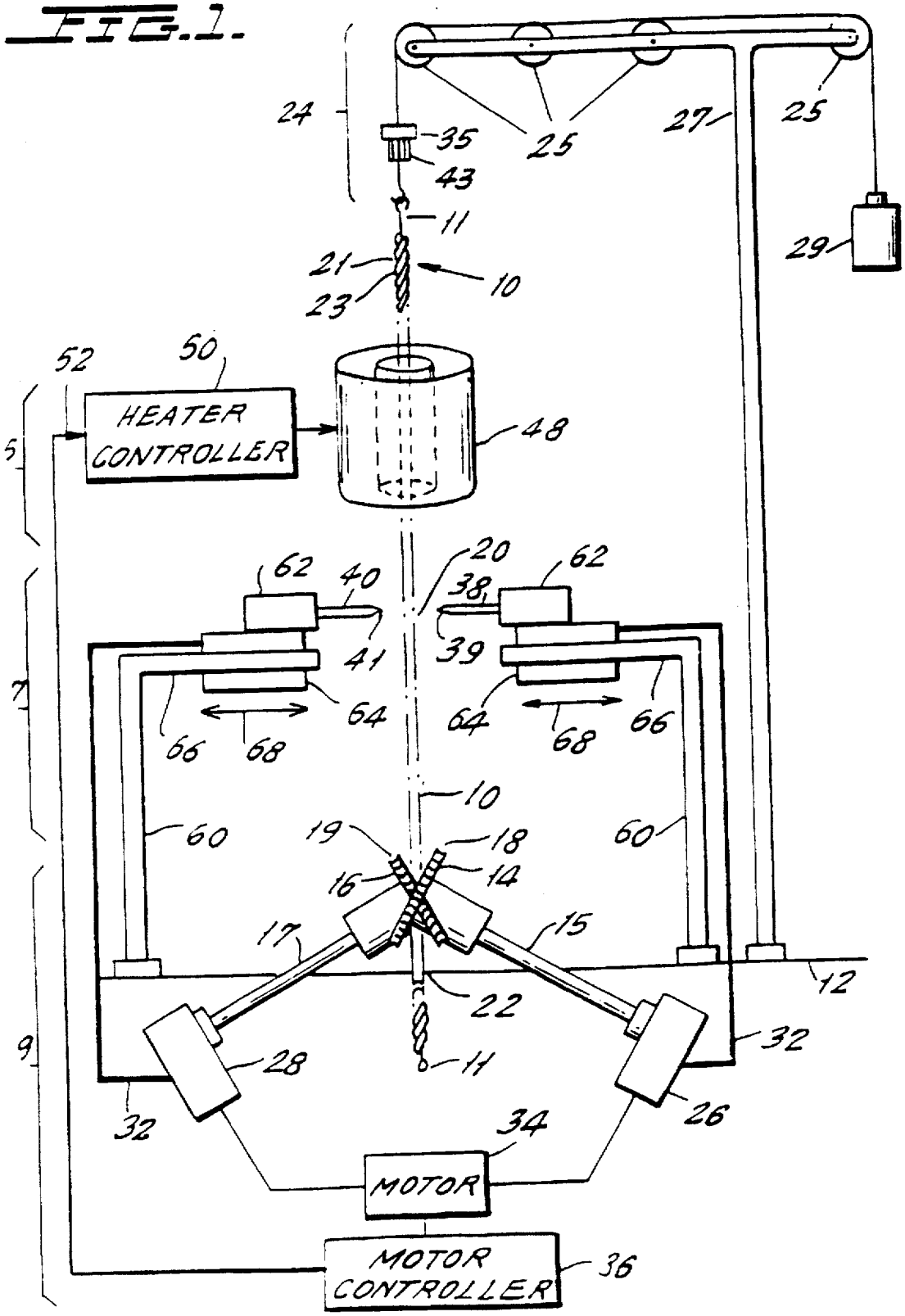
FIG. 1 is a schematic block diagram of the soldering system of the present invention.

As a result, when the gears 14 and 16 are rotated in the direction of their respective arrows 44 and 46 by the equivalent of a one gear tooth movement, the link junctions 31 and 33 are sequentially positioned, one after another, at a predetermined soldering position 20 (FIG. 1 or FIG. 4(b)) which, as will be seen, enables the soldering mechanism 7 to apply a minute amount of solder paste at each such link junction 31, 33, etc.

It will be appreciated that, since the rope chain 10 is constituted of the twisted pair of continuous strands 21 and 23, as the gears 14 and 16 rotate the rope chain 10 is slowly rotated as it advances through the gears 14 and 16.

The feeding mechanism 9 for the rope chain 10 shown in FIG. 1 corresponds to the embodiment of FIGS. 4(a) and 4(b) in which the shafts 15 and 17 for the gear 14 and 16 are supported at the horizontally disposed platform 12. The rope chain 10 is fed through an opening 22 in the platform 12 from a bin (not shown) from which it is fed to a position above the platform 12.

FIGS. 3(a) and 3(b) illustrate an alternate embodiment wherein the shafts 15 and 17 of the gears 14 and 16 are supported in a vertically disposed wall 12'. Operationally, both embodiments provide the same function, except possibly that in the FIGS. 3(a) and 3(b) embodiment a less cluttered platform 12 is provided.

It is desirable that the gears 14 and 16 be resiliently biased toward one another. This enables the gears 14 and 16 to press on and firmly hold the rope chain 10 with a desired, predetermined pressure. To this end and as shown by FIG. 3(b), the shaft 17 of the gear 16 may have affixed to it a block 54 which is biased by a spring 56 that is itself anchored against a fixed brace 58. The gear 16 is thus resiliently urged toward the gear 14 by the spring 56. A similar arrangement is also provided for the embodiment of FIGS. 4(a) and 4(b) (not shown).

After each stepped advancement of the rope chain 10, a first and second solder-applying hollow needle 38 and 40 is moved laterally to apply a controlled, measured amount of solder paste to the rope chain 10, on diametrically opposed sides thereof and precisely at the link junctions 31, 33, etc. that are at that instant positioned at the soldering position 20 adjacent the hollow needles 38 and 40.

For ease of presentation, the needles 38 and 40 have been drawn in FIG. 1 at an exaggerated distance away from the gears 14 and 16. In actuality, the solder-applying needles 38 and 40 are preferably oriented at a 90° angle relative to the plane of FIG. 3(b), whereby their respective needle tips 39 and 41 are able to contact the rope chain at the solder position 20 (FIG. 4(b)) which is located at or very near the point where the chain is engaged by the gears 14 and 16.

With the needles 38 and 40, a first dab of solder is applied at a link junction 31 on the first strand 21 and a second dab of solder is applied to the link junction 31 on the second strand 23.

As feeding of the chain continues, its link junctions 31, 33 will have had solder applied to them prior to their arrival and passage through the heater station 5 which includes a heater, e.g. an induction heater 48 and a heater controller 50. At the heater 48 the solder paste is caused to flow, set and in this manner secure the rings 13 to one another. After a desired length of the chain has been processed, it may be cut away and the reinforcing wires 11 removed to provide a completed rope chain that is ready to have clasps attached to it and to be polished.

The heater/controller 50 provides electrical power to the heater 48 and may, if desired, be linked to the motor controller 36 by an electrical line 52 by which it is possible to disable the heater/controller 50 when the motor 34 has ceased running, to prevent overheating of the rope chain 10. In addition, an input from the heater controller 50 to the motor controller 36 might be used to disable the motor 34 until such time as the heater 48 has reached a predetermined temperature.

The rope chain pulling system 24 comprises pulleys 25, a support 27, a weight 29, and a coupling 35. The lower portion 43 of the coupling 35 is rotatable relative to its upper portion enabling the system 24 to pull the rope chain and maintain it taut while it is being slowly rotated by the feeding mechanism 9.

FIG. 1 schematically illustrates the concept of the soldering station 7 and shows a pair of L-shaped brackets 60 which are secured at one end thereof to the platform 12. The solder-applying needles 38 and 40 are coupled to solder paste reservoirs 62 that are secured to reciprocally movable blocks 64, which slide on the short arms 66 of the brackets 60 in the directions indicated by the arrows 68.

Figure 5:
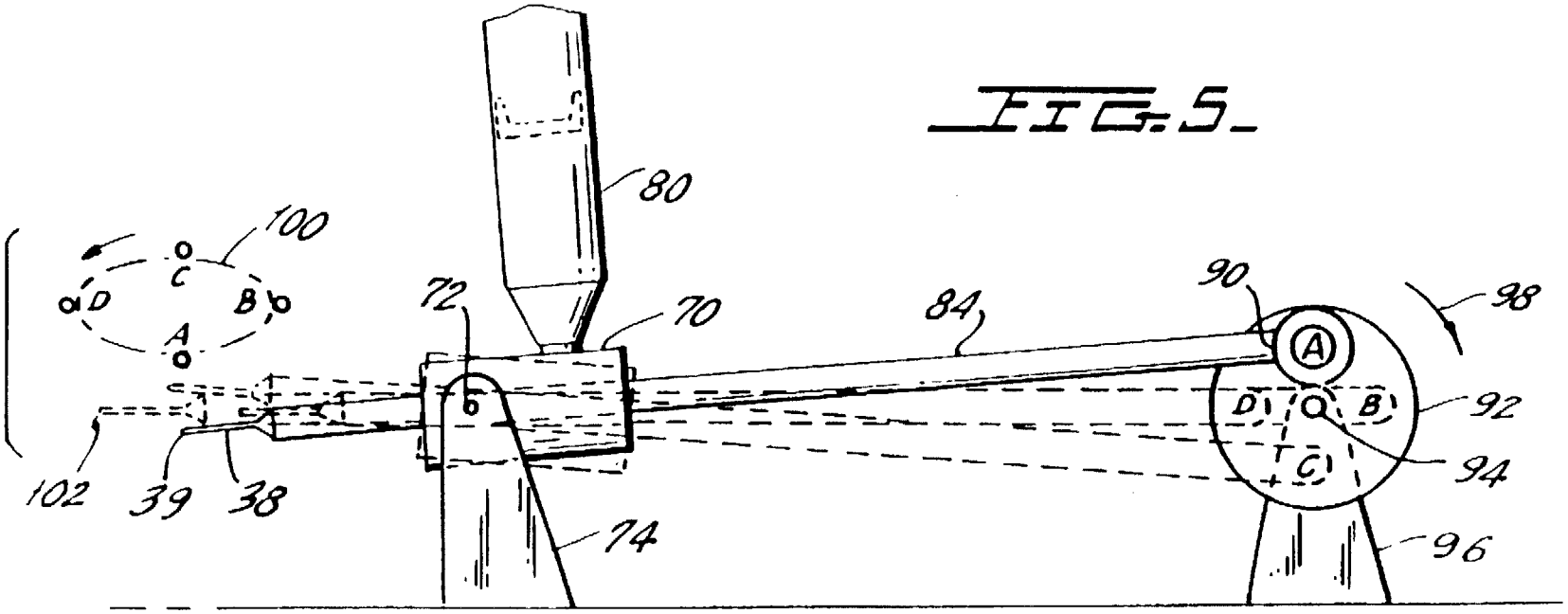
FIG. 5 is a side view of a moving mechanism for a solder-applying device in accordance with the first embodiment of the present invention.
Figure 6B:
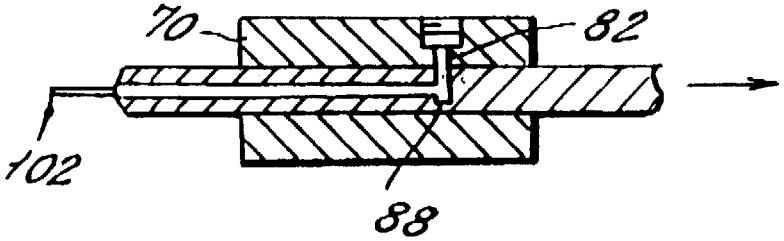
FIGS. 6(a) and 6(b) are cross-sections showing details of a portion of FIG. 5.
Figure 6A:
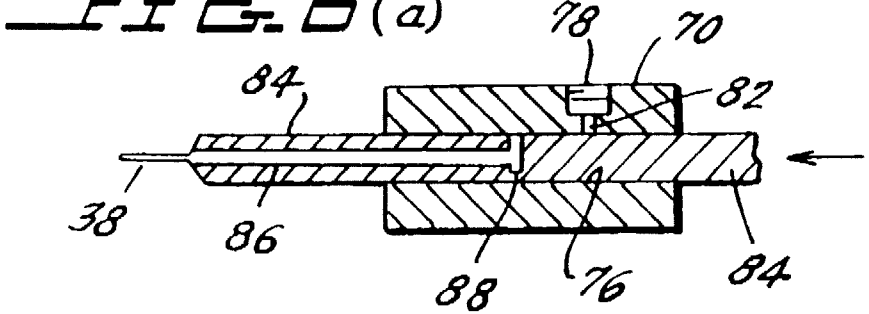

In the more accurately rendered FIGS. 5, 6(a) and 6(b), a first embodiment of the soldering mechanism 7 (generically depicted in FIG. 1) is shown to include a shell 70 pivotally supported by laterally extending hinge pins 72 in a stand 74. As seen in FIG. 6(a), the shell 70 has an axially extending bore 76 and a threaded opening 78 in which a solder container 80 is threadably secured. An orifice 82 leads from the opening 78 into the bore 76.

The solder-applying needle 38 extends from a rod 84, preferably a cylindrical rod that is reciprocally movable within the axial bore 76 and which has defined in it an axially extending solder duct 86 which is in communication with the hollow needle 38. A radially extending orifice 88 of the solder duct 86 communicates with the orifice 82 of the shell 70 when aligned as shown in FIG. 6(b), enabling solder paste to flow from the container 80 into the solder duct 86.

At its other end 90, the rod 84 is pivotally connected to a pulley 92, at a position on the pulley 92 eccentric to a pin 94 about which the pulley 92 is rotatably supported on the support 96. As the pulley 92 rotates in the direction of the arrow 98 (through a motive power provided either from the gear box 28 via a coupling or belt 32 (FIG. 1), or through its own source of motive power, the rod 84 reciprocates in a manner whereby the needle tip 39 traverses the elliptical path 100 (FIG. 5), going through points A, B, C, D corresponding to the positions A, B, C, D of the pulley 92. The previously mentioned soldering position 20 corresponds to needle position D. Preferably, the coupling 32 and gear box 28 are configured to synchronize the motions of the gears 14 and 16 and the needles 38 and 40, in a manner whereby the needles 38 and 40 reach the soldering position 20 immediately after the arrival thereat of a next link junction 31, 33, etc.

In operation, at the position A the needle tip 39 is moving away from the soldering position 20. At position B, the orifices 82 and 88 become aligned (FIG. 6(b)), enabling solder paste held under pressure in the container 80 to flow into the duct 86 and form a dab of hanging solder 102 at the tip 39 of the needle 38. Thereafter, as the pulley 92 traverses through the positions C and D, the needle tip 39 traverses a path that enables it to wipe the solder dab 102 against the link junction 31, 33, etc., then located at the soldering position 20. This completes a single solder-applying cycle.

The soldering mechanism of FIGS. 5, 6(a) and 6(b) is repeated for the needle 40, so that two dabs of solder are simultaneously applied on opposed diametrical sides of the rope chain 10. The amount of solder that is applied is controlled by controlling the pressure of the solder in the container 80 as well as by controlling the dwell time of the pulley 92 at the position B and by careful selection of the cross-sectional sizes of the solder passageways in the rod 84, the needle 38, and orifices 82 and 88.

An alternate embodiment for the solder-applying mechanism 7 is shown in FIGS. 7(a)–7(d), which depict sequential stages in the operation of the alternate mechanism. In this embodiment, a modified shell or block 110 is horizontally disposed and reciprocally movable in an opening 112 provided in a fixed base 114. The block 110 has a rear flange 116 and a compressed spring 118 on its outer circumferential surface which is biased to urge the flange 116 rearwardly, against a stop 120. A solder chamber 122 in the forward portion of the block 110 communicates with the threaded opening 124 for the solder container 80 (FIG. 5). The front end of the solder chamber 122 is bounded by a plug 126 (FIG. 7(b)) which supports the hollow needle 38.

At the rear, the block 110 defines a rear chamber 128 in which a solid ram rod 130 having a solid needle 132 with a sharp tip 134 is reciprocally arranged. The solid needle 132 slides within a connecting passageway 136 that connects the rear and the front chambers 122 and 128 of the block 110.

Figure 7A:
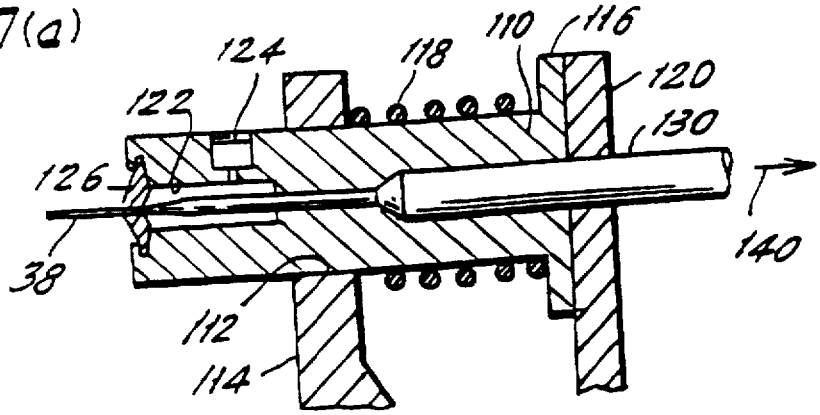
FIGS. 7(a), 7(b), 7(c) and 7(d) are cross-sections of a second embodiment for a needle conveying means, showing successive stages of operation thereof.
Figure 7B:
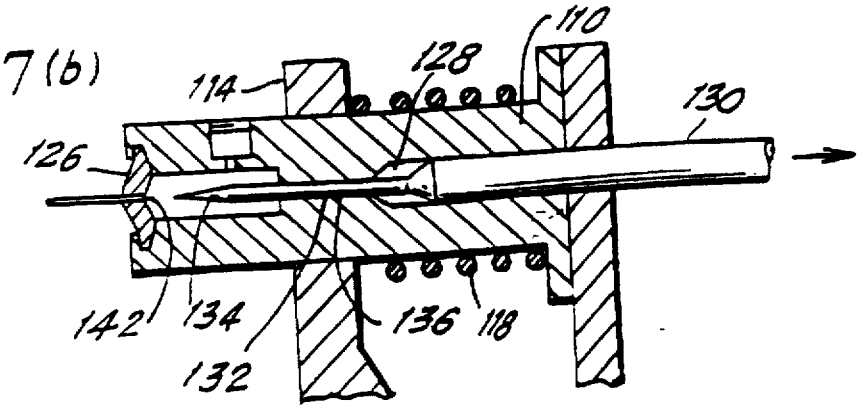

In operation, initially, as shown in FIG. 7(a), the rod 130 begins to move to the right in the direction of the arrow 140 while the block 110 remains stationary. This causes the tip 134 of the solid needle 132 to retreat from the entrance point 142 into the hollow needle 38, allowing solder paste to flow from the container (not shown) via the solder chamber 122 into the needle 38.

Figure 7C:
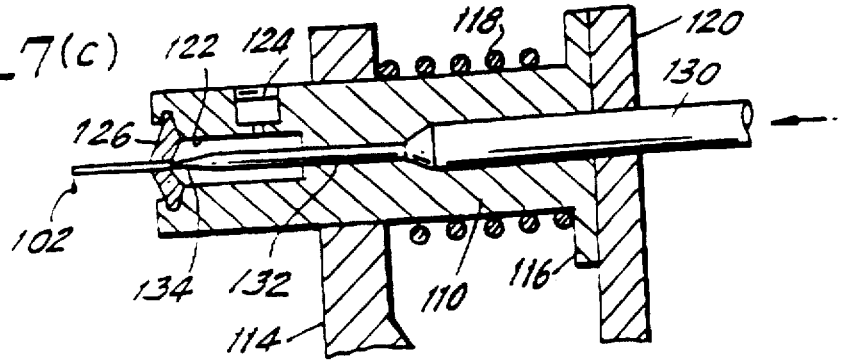

In the next step (FIG. 7(c), the ram rod 130 reverses direction as shown, the entrance of the solid needle 132 into the chamber 122 causing some of the solder paste to issue from the hollow needle 38, creating a solder dab 102 the size of which is determined by the mass size of the solid needle 132 and the degree of penetration of the tip 134 into the hollow needle 38.

Figure 7D:
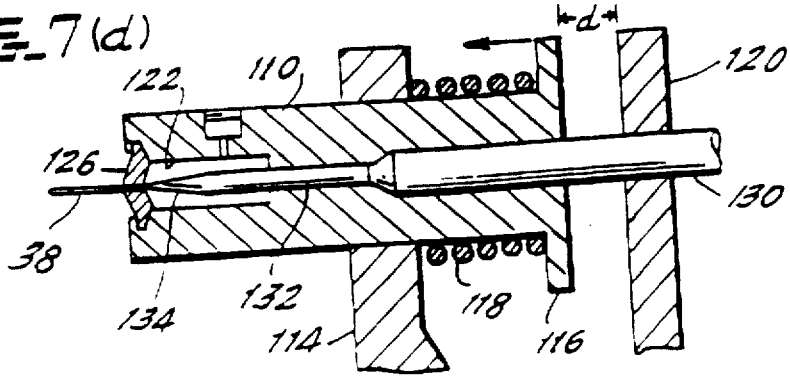

In the final step (FIG. 7(d)), continued forward movement of the rod 130 serves to push the entire block 110 forward by a distance "d", in a manner which enables the tip of the needle 38 to reach the soldering position 20 and apply the solder dab 102 to the rope chain 10.

As noted before, it is possible to control the amount of solder paste applied as by controlling the dwell time of the the rod 130 in its various positions, the pressure of the solder paste in the container 80 as well by selecting the shape and length of the tip 134 and of the solid needle 132.

While the invention has been described above with respect to a rope chain, the same is applicable to other chains, for example to chains in which rings are packed following one another. Moreover, the concept of the invention might be used with only a single toothed gear, using an arrangement where the chain is supported or pressed against a back wall.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A soldering machine for automatically soldering links of a chain, in which the links are disposed adjacent one another and define link junctions, said machine comprising:

feeding means for feeding the chain in a forward direction and in a manner which places successive ones of said link junctions at a solder position, the feeding means comprising at least one rotatable gear which is disposed to engage and advance the links; and soldering means including solder-applying means for applying solder paste to the chain at said link junctions.

2. A soldering machine for automatically soldering links of a chain, in which the links are disposed adjacent one another and define link junctions, said machine comprising:

means for holding the chain in position for enabling the link junctions to be soldered;

soldering means, including solder-applying means for applying solder paste to the chain at said link junctions;

said solder-applying means including a hollow needle having a needle tip and means for feeding solder paste through said needle tip; and means for causing the needle tip to traverse an elliptical path with said needle tip contacting said chain over a portion of said elliptical path.

3. A soldering machine for automatically soldering links of a chain, in which the links are disposed adjacent one another and define link junctions, said machine comprising:

means for holding the chain in position for enabling the link junctions to be soldered;

soldering means including solder-applying means for applying solder paste to the chain at said link junctions;

the solder-applying means comprising:

at least one hollow needle having a needle tip for applying solder therethrough to said link junctions;

a block with a solder chamber, the needle being in fluid communication with the solder chamber; and a solid ram rod having a portion which is reciprocally movable within the solder chamber in a manner which is effective to dispense from the hollow needle predetermined amounts of solder paste.

4. The soldering machine of claim [3] 22, wherein each of said gears comprises gear teeth that are spaced relative to one another at a pitch that matches a pitch associated with the link junctions.

5. The soldering machine of claim 4, wherein the chain is a rope chain having at least a pair of strands, each strand comprising adjacently located chain rings.

6. The soldering machine of claim 5, wherein each of the gears is constructed to constantly engage a respective one of the strands.

7. The soldering machine of claim 6, wherein the first gear is connected to and is rotatable by a first shaft and the second gear is rotatable by a second shaft.

8. The soldering machine of claim 7, further comprising a vertically extending platform, said shafts supported at said vertical platform.

9. The soldering machine of claim 7, further comprising a horizontally disposed platform, said gears being secured at said horizontally extending platform.

10. The soldering machine of claim 7, further comprising a heater for heating solder applied by said soldering means.

11. The soldering machine of claim 7, further comprising rotating means for rotating the gears stepwise, each step of rotation having the effect of rotating the chain through a predetermined angular displacement.

12. The soldering machine of claim 7, further comprising means for urging the gears toward one another.

13. The soldering machine of claim 4, wherein the solder-applying means includes at least one reciprocally movable hollow needle.

14. The soldering machine of claim 13, further including means for synchronizing the feeding means and the solder-applying means to one another.

15. The soldering machine of claim 13, the solder-applying means including a rotatable pulley, a pivotably mounted shell, and a rod reciprocally movable through the shell by the pulley, said hollow needle being coupled to said rod.

16. The soldering machine of claim 15, further comprising a solder chamber within the rod, a solder paste container supported on the shell and means for conveying solder paste from the solder container into the solder chamber.

17. The soldering machine of claim 16, wherein the hollow needle has a needle tip and the pulley is effective to cause the needle tip to traverse a predetermined path.

18. The soldering machine of claim 17, wherein the path is elliptical.

19. The soldering machine of claim 4, the soldering means comprising a heater.

20. The soldering machine of claim 4, further comprising means for maintaining the chain taut.

21. The soldering machine of claim 4, wherein the solder-applying means includes first and second reciprocally movable hollow needles.

22. The soldering machine of claim 1, wherein the at least one rotatable gear comprises first and second rotatable gears which are disposed to engage and advance the links.

23. The soldering machine of claim 2, wherein the means for causing the needle tip to traverse a predetermined path includes a rotatable pulley, a pivotally mounted shell, and a rod reciprocally movable through the shell by the pulley, said hollow needle being coupled to said rod.

24. The soldering machine of claim 23, further comprising a solder chamber within the rod, a solder paste container supported on the shell and means for conveying solder paste from the solder container into the solder chamber.

25. The soldering machine of claim 3, including a fixed base, the block being reciprocally movable within the fixed base.

26. The soldering machine of claim 25, wherein the solid ram rod comprises a solid needle having a needle tip which is reciprocally movable in the solder chamber to alternatively engage and disengage the hollow needle.

*27. A soldering method for automatically soldering links of a chain, in which the links are disposed adjacent one another and define link junctions, said method comprising:*

*feeding the chain with at least one rotatable gear which is disposed to engage and advance the links of the chain in a forward direction and in a manner which places successive ones of said link junctions at a solder position; and*

*applying solder paste to the chain at said link junctions.*

*28. The method of claim 27, including feeding the chain with and between first and second rotatable gears which are disposed to engage and advance the links.*

*29. The method of claim 28, wherein the chain is a rope chain having at least a pair of strands, each strand comprising adjacently located chain links and wherein each of the gears is constructed to constantly engage a respective one of the strands.*

*30. The method of claim 29, further comprising rotating the gears stepwise, each step of rotation having the effect of rotating the chain through a predetermined angular displacement.*

*31. The method of claim 27, including applying the solder paste with a needle having a needle tip and causing the needle tip to traverse a predetermined path.*

*32. The method of claim 31, wherein the predetermined path is elliptical.*

*33. A method for automatically soldering links of a chain, in which the links are disposed adjacent one another and define link junctions, said method comprising the steps of:*

*holding the chain in position for enabling the link junctions to be soldered;*

*applying solder paste to the chain at said link junctions, said solder paste being applied by means of a hollow needle having a needle tip and feeding solder paste through the said needle tip; and*

*causing the needle tip to traverse an elliptical path with said needle tip contacting said chain over a portion of said elliptical path.*

* * * * *